United States Patent
Rynbeek

(10) Patent No.: US 11,590,436 B2
(45) Date of Patent: Feb. 28, 2023

(54) BYPASS AND FULL FLOW COMBINATION FILTER

(71) Applicant: Winchester Global Pty Ltd, South Perth (AU)

(72) Inventor: Colin James Rynbeek, Willetton (AU)

(73) Assignee: Winchester Global Pty Ltd, South Perth (AU)

( * ) Notice: Subject to any disclaimer, the term of this patent is extended or adjusted under 35 U.S.C. 154(b) by 625 days.

(21) Appl. No.: 16/617,664

(22) PCT Filed: Jun. 1, 2018

(86) PCT No.: PCT/AU2018/000089
§ 371 (c)(1),
(2) Date: Nov. 27, 2019

(87) PCT Pub. No.: WO2018/218278
PCT Pub. Date: Dec. 6, 2018

(65) Prior Publication Data
US 2020/0179834 A1    Jun. 11, 2020

(30) Foreign Application Priority Data

Jun. 1, 2017 (AU) ................. 2017902093

(51) Int. Cl.
*B01D 27/10* (2006.01)
*B01D 27/14* (2006.01)
*F01M 1/10* (2006.01)
*F02M 37/22* (2019.01)

(52) U.S. Cl.
CPC ......... *B01D 27/103* (2013.01); *B01D 27/144* (2013.01); *F01M 1/10* (2013.01); *F02M 37/22* (2013.01); *B01D 27/146* (2013.01); *F01M 2001/1057* (2013.01)

(58) Field of Classification Search
CPC .... B01D 27/06; B01D 27/103; B01D 27/144; B01D 27/146; F01M 1/10; F01M 2001/1057; F01M 2001/1092; F02M 37/22; F02M 37/34; F02M 37/36
See application file for complete search history.

(56) References Cited

U.S. PATENT DOCUMENTS

2005/0126965 A1   6/2005   Meddock et al.

FOREIGN PATENT DOCUMENTS

| EP | 1118368 B1 | 7/2001 | |
| PL | 170559 B1 * | 12/1996 | ............. B01D 27/14 |
| WO | 2008115494 A1 | 9/2008 | |
| WO | 2016070222 A1 | 5/2016 | |

OTHER PUBLICATIONS

PCT International Search Report for PCT/AU2018/00089, dated Jul. 18, 2018.

* cited by examiner

*Primary Examiner* — Terry K Cecil
(74) *Attorney, Agent, or Firm* — The Webb Law Firm

(57) ABSTRACT

The present invention relates to a filter for filtration of oil and/or fuel comprising a combination of a bypass filter portion and a full flow filter portion. The present invention also relates to a method of using the filter for filtration of oil and/or fuel to remove the water/moisture and particulate contaminants therein.

19 Claims, 3 Drawing Sheets

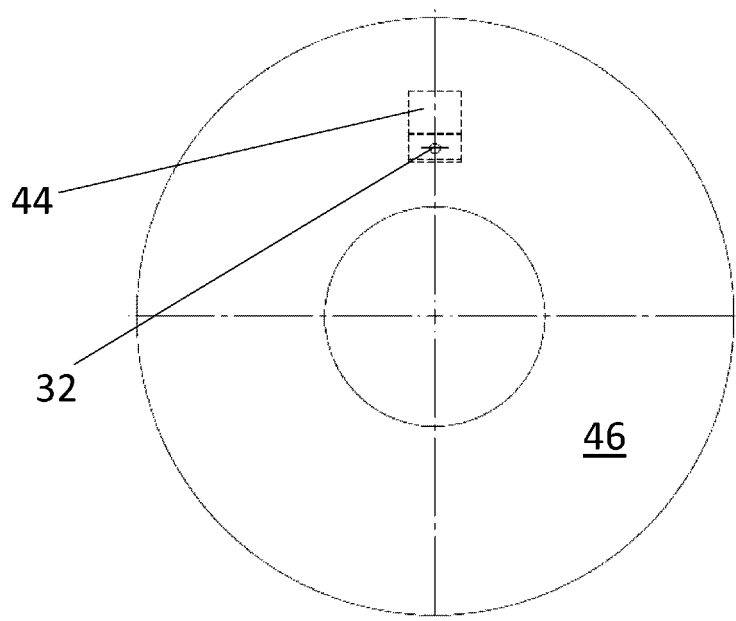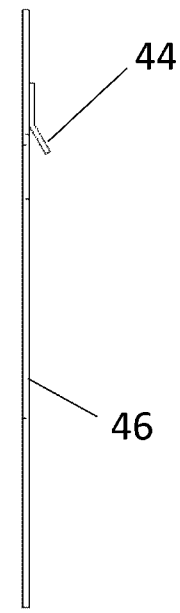
Figure 3a                Figure 3b
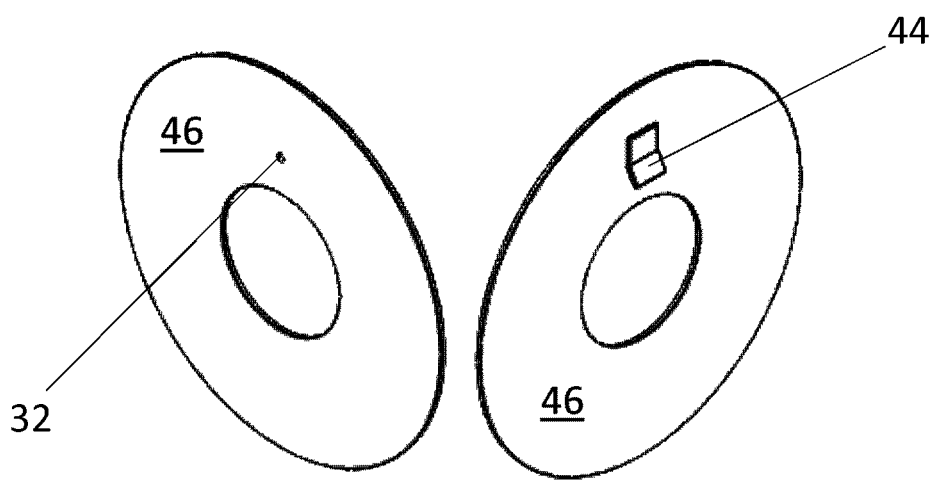
Figure 4a                Figure 4b

BYPASS AND FULL FLOW COMBINATION FILTER

CROSS-REFERENCE TO RELATED APPLICATIONS

This application is the United States national phase of International Application No. PCT/AU2018/000089 filed Jun. 1, 2018, and claims priority to Australian Patent Application No. 2017902093 filed Jun. 1, 2017, the disclosures of which are hereby incorporated by reference in their entirety.

FIELD OF THE INVENTION

The present invention relates to a filter being a combination of a bypass and full flow filter, and methods for the use and manufacture thereof.

BACKGROUND

Commonly used spin-on oil and fuel filters for all diesel and petrol engines result in deterioration of oil caused by accelerated accumulation of moisture and particulate contamination. This depletes the engine oil additive package, including Total Base Number (TBN), resulting in undesirable sludge, varnish and accelerated oil oxidation. Also, fuel economy and emission standards prematurely deteriorate as the Original Equipment Manufacturers (OEM) design function of the fuel injection systems and piston rings become impaired. Hence, the engine oil is 'spent' at a mere 250-500 hours in a diesel engine and 10,000 kilometres in a car petrol engine. These adverse outcomes are largely the result of filters being full flow of about 70-180 litres of oil per minute passing through the filter. It should be noted that the full flow spin-on oil and fuel filters commonly used today were, in fact, designed in the 1950's. It is therefore necessary to bring the filter technology up to date.

While particulate contamination has a more direct influence on machine condition, water contamination has a more direct influence on lubricant condition. Independently, both contaminants degrade both the machine and lubricant conditions. Together, they can feed off each other to greatly increase the degradation rates of both the machine and the lubricant. One of the more critical lubricant condition properties is oxidation; all lubricants will oxidise over time. The oxidation process is accelerated in the presence of elevated temperatures, water content, metal catalysts and solid contaminants. Beginning with the formation of organic peroxides, further oxidation results in the formation of alcohols, aldehydes, ketones and organic acids. These products can be further oxidised to form high molecular weight polymers that are insoluble in oil. These polymers manifest themselves as sludge, varnish and gums and impair normal equipment operation. Organic acids formed as a result of oxidation are corrosive to many machine component metals and thus increase the rate of corrosive wear. Additionally, with oxidation, lubricants increase in viscosity, further compounding the oxidation rate by increasing the fluid friction and therefore the heat input to the oxidation process.

Solid contaminants, whether they are dirt or wear-generated debris, will increase the oxidation rate of the lubricant because these materials contain metals that catalyse the oxidation process. The presence of these metals alone can cause oxidation rates to increase five (5) times the normal rate, while the presence of water can increase the oxidation rate ten (10) times. Combined, water and metal catalysts can increase the oxidation rate fifty (50) times or more: 5 (metal particulate)×10 (water)=50 times the rate of oil oxidation (from USA Engine Tribology).

Bypass filters, where the majority of fluid undergoes course filtration on each pass through the OEM full flow filter, with some passing through a kidney loop bypass filter and being subject to fine filtration, are known to be most effective and can significantly lengthen the time between oil changes to 2,000 hours and more. These are mainly sold in the aftermarket, where there is consumer resistance to fitting hose connections, difficulty with finding sufficient space under the bonnet, difficulty with accessing hose connection points and unwarranted concerns about engine warranty associated with use of extraneous parts and fittings. As such, a bypass filter, which is retro-fittable to directly replace the original spin-on OEM filter was created.

However, engine manufacturing debris is cleaned out when the engine is first started and there may be excessive debris that will cause catastrophic engine failure when the full flow filter is replaced with a purely bypass filter at the time of manufacture. This may occur as there is insufficient time for filtration by a spin-on bypass oil filter (that works on multiple pass with over ninety percent of oil flow returning to the sump unfiltered), whereas a full flow filter will remove manufacturing debris above 30 micron in size in the first pass. A purely bypass spin-on or cartridge oil filter may replace the legacy full-flow oil filter, but only after the OEM prescribed engine run-in period and the first oil change that removes manufacturing debris comprised of metal and dust. It is far more acceptable to the OEM and the oil, fuel and hydraulic filter market to be provided with a solution to the reality that all current spin-on oil and centrifugal oil filters are not designed to enable engines to operate with substantially no sludge, resin or particulate at a size of 5 microns, at 1,000-2,000 extended hour oil change. It is also far more acceptable to the OEM and the oil, fuel and hydraulic filter market that the solution to the problematic spin-on oil filters currently used in all petrol/gasoline and diesel engines continues to incorporate a full flow filter in some form.

Further, it has been confirmed, in comparison testing between the currently used spin-on filter elements and new metal mesh filter elements, that present full flow filter mediums perform rather poorly. This is because the standard filtration media made from glass fibres tend to flex when the engine or hydraulic system is started and shut down. Every change of flow parameters in the fibreglass filter causes about two thirds of the contaminants held in the filter element to dislodge, re-contaminating the oil over and over again. This explains the experience of particulate shedding or lack of ability to retain particulates from re-contaminating the oil during fluctuations in flow. The metal filtration medium does not have this problem, as it does not stretch during extreme flow fluctuations of 50-180 litres per minute caused by engine switch on and shut off. Testing of metal fibre filter elements resulted in them being classified at ISO 10. At ISO 21 there are 21,000 particles per ml; at class 10 there are only 11 particles per ml. The present diesel engine ISO classes are at best 18-16-13. Metal fibre filters have been shown to maintain 99-99.5% efficiency between 6.1 and 6.9 micron particle size compared with 20-30 micron filtration achieved with previous filters; metal filters outperform current filtration media by a factor of seven (average Beta Ratio improves from 13 to 95).

However, metal filtration medium is rather costly such that it tends to be used in nuclear power generation industry or high-end aircraft engines (e.g. engines of certain commercial airplanes). Recently, it was found that the cause of a catastrophic helicopter crash was due to the pressure and flow rate of hydraulic oil shattering glass filter medium to the extent that the glass contamination (that is vastly more abrasive than steel contamination) was the cause of the rotors stopping during flight. Still, pleated glass filter medium is used in about 98% of the full flow oil filters (due to its low cost), but recent research has confirmed that when brittle glass is pleated that shards break away from the edge of the pleating to contaminate the oil.

The present invention attempts to overcome at least in part some of the aforementioned disadvantages of conventional engine oil filtering devices.

SUMMARY OF THE INVENTION

In accordance with one aspect of the present invention there is provided a filter for filtration of oil and/or fuel comprising a combination of a bypass filter portion and a full flow filter portion.

Preferably, the bypass filter portion and full flow filter portion are encased within a unitary filter body.

Each of the bypass and full flow filter portions has its respective filtration medium referred to as a bypass filtration medium or full flow filtration medium.

The bypass filter portion has a restriction orifice, for regulating the flow rate or filtration rate of the oil and/or fuel.

The restriction orifice has a diameter of between about 0 mm and 20 mm, 0 mm and 15 mm, 0 mm and 10 mm, 1 mm and 10 mm, or 1 mm and 5 mm. In one preferred embodiment, the restriction orifice has a diameter of between about 0 mm and 4 mm.

In accordance with a second aspect of the present invention there is provided a method of filtration of oil and/or fuel comprising the use of a filter comprising a combination of a bypass filter portion and a full flow filter portion.

BRIEF DESCRIPTION OF DRAWINGS

The present invention will now be described, by way of example, with reference to the accompanying drawings, in which:

FIG. 3*a* is a plan view of a face plate 46 of the bypass filter portion 14 of a filter according to the present invention;

FIG. 3*b* is a side view of the face plate 46 of FIG. 3;

FIG. 4*a* is a perspective view of the forward side of the face plate 46 of FIG. 3; and FIG. 4*b* is a perspective view of the rear side of the face plate 46 of FIG. 3.

DESCRIPTION OF PREFERRED EMBODIMENTS

Figure 1:
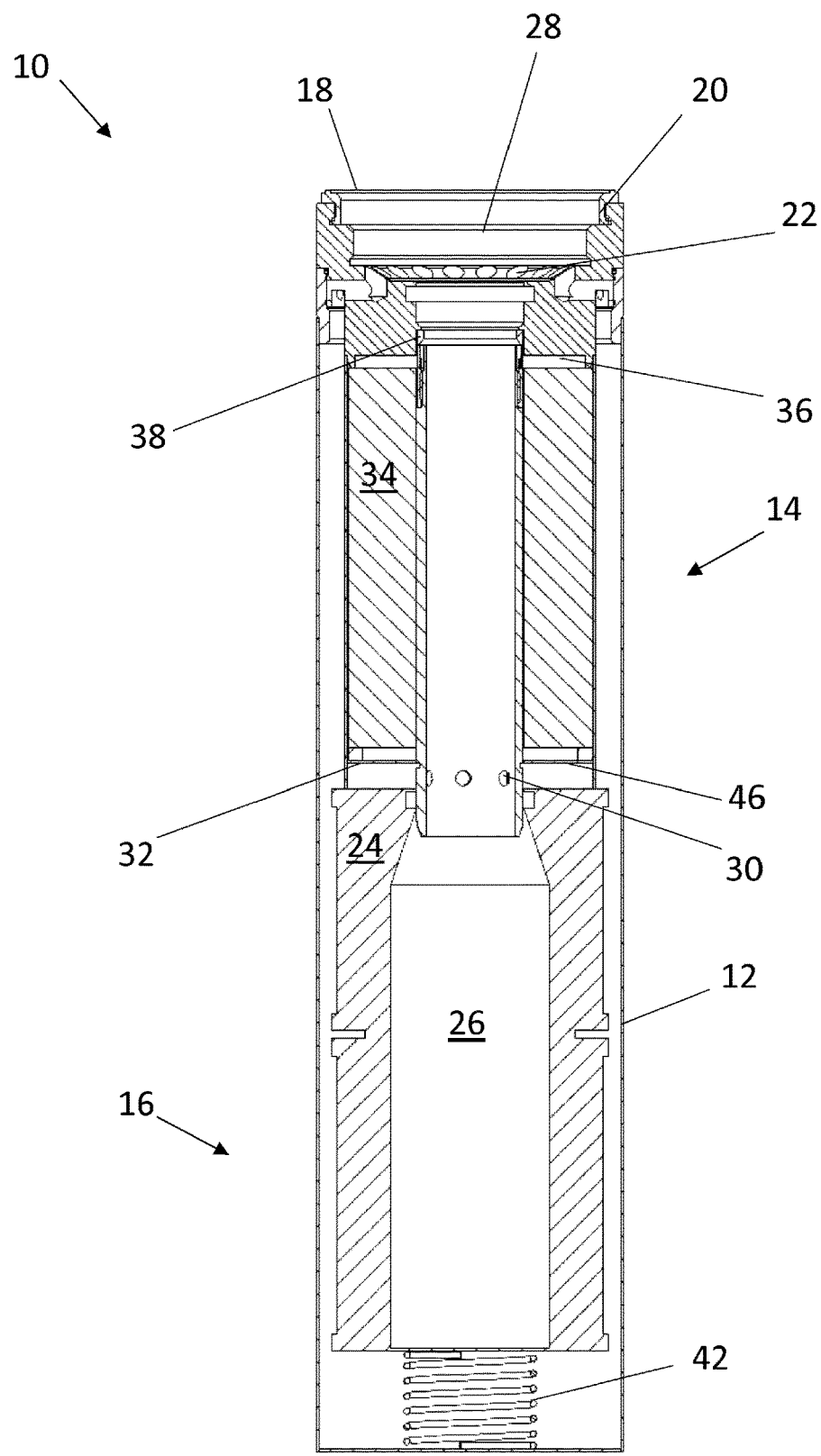
FIG. 1 is a section view of a filter in accordance with one embodiment of the present invention.

Referring to the Figures, there is shown a combination bypass and full flow filter 10 for converting a full flow oil and/or fuel filter system into a part bypass and part full flow filter system according to a preferred embodiment of the present invention. The filter 10 comprises a unitary body 12 which acts to encase the internal parts of the filter 10, which is substantially cylindrical in shape. The filter 10 comprises both a bypass filter portion 14 and a full flow filter portion 16. With specific reference to FIG. 1, the body 12 of the filter 10 comprises a front face 18 forming a substantially circular cover for a majority of the front end of the filter 10. The front face 18 is shaped so as to enable it to receive an annular seal 20. It is preferred that the size, shape and configuration of the front face 18 and seal 20 is such that the filter 10 is complementary to connect to an oil and/or fuel reservoir on which it is used or is identical to the OEM filter it can replace.

The front face 18 comprises an inlet port 22 which includes at least one aperture that allows entry of oil or fuel to the internal portion of the filter 10. The inlet port 22 opens to a full flow filtration medium 24 at the full flow filter portion 16 of the filter 10. The full flow filtration medium 24 preferably comprises a metal filter medium, such as a pleated stainless-steel metal filter medium. However, glass or cellulose fibre may also be used for the full flow filtration medium 24 where reduced costs are required, but more frequent changes of filter elements may result. Internal of the full flow filtration medium 24 is a centrally disposed return channel 26 extending the length of the filter 10 to an outlet 28.

Within the return channel 26 proximal to the bypass filter portion 14 is located a bypass inlet 30, which comprises at least one aperture allowing entry of oil or fuel to the bypass filter portion 14 from the return channel 26. A restriction orifice 32 is disposed within a face plate 46 at a forward end (according to the direction of flow of fluid through the filter 10) of the bypass filter portion 14, between the bypass inlet 30 and a bypass filtration medium 34, the restriction orifice 32 allowing for a controlled volume of fluid to pass into the bypass filtration medium 34 from the bypass inlet 30. The restriction orifice 32 has a diameter of between about 0 mm and 20 mm, or preferably between about 0 mm and 10 mm, and, in use, allows the passage of oil and/or fuel between about 0 and 10 litres, about 1 and 7 litres, or about 0 and 4 litres of fluid per minute. More preferably, the orifice 32 is between about 0 mm and 4 mm in diameter, or most preferably about 2 mm in diameter and, in use, allows the passage of between about 0.5 and 2 litres of fluid per minute, between about 1 and 2 litres of fluid per minute, or most preferably about 1.2 litres of fluid per minute. The pressure of the fluid allowed through the restriction orifice 32, which fluid accordingly permeates through the bypass filter portion 14 rather than directly to the outlet 28, is preferably between about 0 and 10 psi, more preferably between about 4 and 6 psi.

Advantageously, when the filtration rate through the bypass filter portion 14 is reduced within a range of about 0 and 4 litres of fluid per minute (e.g. between about 0.5 and 2 litres of fluid per minute), it enables the bypass filtration medium 34 to capture and retain fine particles as well as water down to 0%-0.1% by content at oil change.

On a rear side of the face plate 46 (according to the direction of flow of fluid through the filter 10) aligned with the restriction orifice 32 is a deflector 44 (see FIGS. 3*a-b* and 4*a-b*). The deflector comprises a planar surface which, in use, causes fluid through the restriction orifice to be dispersed across a forward end (according to the direction of flow of fluid through the filter 10) of the bypass filtration medium 34. The deflector 44 acts to prevent "channelling" into a discrete area of the bypass filtration medium 34.

In another embodiment, the restriction orifice 32 may be positioned or arranged such that no deflector 44 would be necessary. In this instance, the oil or fuel may be directed by pressure across the forward end of the bypass filtration medium 34 (or directed by pressure across the space between the face plate 46 and the bypass filtration medium 34), to ensure even spread of the fluid before its permeation through the bypass filtration medium 34.

The bypass filtration medium 34 is disposed such that oil or fuel passes through the bypass filtration medium 34 from the restriction orifice 32. The bypass filtration medium 34 preferably comprises long cellulose fibre, being a virgin base with no dyes, acetone or reagents. The cellulose fibres may be arranged in the form of a cellulose coil, cellulose roll or a stack of cellulose discs. The cellulose fibres are able to absorb water/moisture, as well as adsorb particulate contaminants via surface charge attraction. Other than cellulose fibres, the bypass filtration medium 34 may also be formed of polymers with water/moisture and particulate contaminants absorptivity or adsorptivity, so as to remove these contaminants from the oil or fuel.

When the bypass filtration medium 34 is formed of cellulose fibres, it may further comprise a satchel of moisture-absorbing polymer to absorb substantially all moisture from the oil or fuel. The moisture filtered from the oil or fuel (via cellulose and/or polymer filter elements) includes both heavy water and water in emulsion with the oil/fuel (sludge). While removing contaminants from oil being filtered, it has been found that the present invention conserves the oil additive package, including TBN the alkalinity booster, providing substantial benefits for the machinery on which it is used.

It is preferred that the bypass filtration medium 34 (e.g. formed of cellulose fibres) is a sheet in a coiled or rolled arrangement within the substantially cylindrical filter 10. Other common configurations may be used for arrangement of the bypass filtration medium 34, including a compressed block or unitary piece of medium.

A cavity 36 is provided at an end of the bypass filtration medium 34 distal from the restriction orifice 32. In connection with the cavity 36 is one end of a channel 38, another end of which opens to the outlet 28 for release of fluid from the bypass filter portion 14 of the filter 10. A venturi effect may be created at the channel 38 and/or the channel 38 may comprise a pressure release valve. Preferably, venturi effect is used to release the fluid after filtration, as it further simplifies the number of components required to manufacture the combination filter of the present invention.

The filter 10 further comprises a spring 42 disposed between the full flow filter portion 16 and body 12. The spring 42 acts to maintain internal pressure as well as alignment of the internal components of the filter 10.

The filter 10 is a spin-on filter preferably with a dimension which can readily replace the current spin-on oil/fuel filters used on petrol/gasoline and diesel engines. However, filter 10 can also be of other dimensions as desired, particularly when used as an additional oil or fuel filter in a vehicle.

Figure 2:
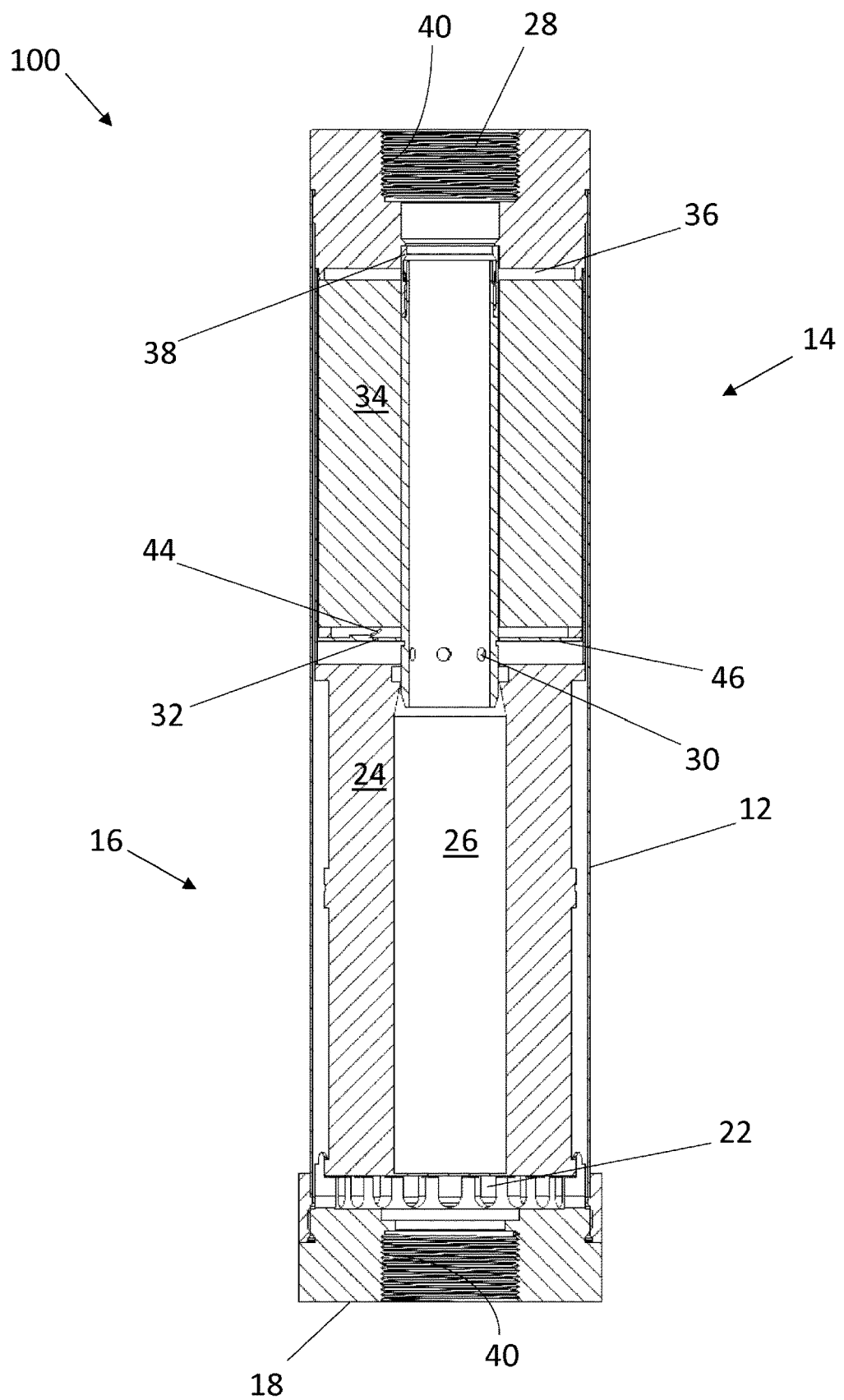
FIG. 2 is a section view of a filter in accordance with a second embodiment of the present invention.

With reference now to FIG. 2, an alternative embodiment filter 100 of the present invention is shown, with like numbers referencing like parts to the first embodiment described above. The filter 100 is designed to be scaled in size to be large enough for trucks and other large vehicles to operate on a 100,000 mile extended oil and filter change. The filter 100 comprises apertures at the inlet port 22 allowing entry to the full flow filtration medium 24, encircling the return channel 26, at the full flow filter portion 16 of the filter 100. Similar to the first embodiment, the filter 100 comprises bypass filtration medium 34 within the bypass filter portion 14 for fine filtration of controlled volume of fluid. The filter 100 further comprises an outlet 28 through which fluid exits the filter either from the full flow filter portion 16 through the return channel 26 or from the bypass filter portion 14 through the channel 38.

The filter 100 may comprise threaded portions on the internal wall 40 of the front face 18 and/or the outlet 28. As would be understood by the person skilled in the art, the threaded portions provide a connection means by which the filter 100 may be threaded to and connect with the engine, fuel system, transmission or hydraulic or other system on which it is used. Hose connectors and/or adapters may be used on the threaded portions to allow use of the filter 100 in a location other than where an oil and/or fuel filter would normally be used on a particular piece of machinery (e.g. the filter 100 may be placed into or along a chassis section of a truck).

While the filter 10, 100 as exemplified in FIGS. 1 and 2 are arranged such that the bypass filter portion 14 is disposed near the outlet 28, in another embodiment, the bypass filter portion 14 and full flow filter portion 16 may be arranged in an opposite manner (i.e. with the full flow filter portion 16 disposed near the outlet 28). With either arrangement, the bypass filter portion 14 and full flow portion 16 are advantageously disposed, encased or compacted within the same unitary body 12. Therefore, in one simple compact unit, which is convenient to manufacturer, transport, display and install, the present combination filter simultaneously affords full flow filtration (for fast removal of large particulate/ sludge matters) and bypass filtration (for removal of water/ moisture and fine particulate matters). This significantly minimises the rate of oil acidation, oxidation and breaks the 'wear makes more wear' cycle to markedly improve fluid cleanliness standard and decrease service and maintenance costs.

In one particular embodiment, the filter 10 or 100 with a unitary body 12 preferably has a pleated stainless-steel metal filter medium as the full flow filtration medium 24, and cellulose fibres in coiled or rolled arrangement as the bypass filtration medium 34. The bypass filtration medium 34 may additionally comprise a satchel of moisture-absorbing polymer to substantially absorb all moisture from the oil or fuel being filtered. The bypass filter portion 14 may optionally comprise a deflector 44.

With the filter 10, 100, the bypass filter portion 14 and full flow filter portion 16 may each be a fully, or substantially, encased or enclosed unit, having its own container wall(s) encircling the filtration medium 34 or 24. For example, the bypass filtration portion 14 and full flow filter portion 16 may each be within a canister of its own, while both filter portions 14 and 16 are disposed within the unitary body 12.

Although the bypass and full flow filter portions 14 and 16 in the embodiments 10 and 100 have a substantially uniform and/or cylindrical body, the bypass and/or full flow filter portions in other embodiments may have a non-uniform body (e.g. with recesses or protrusions), or take any shape, depending on how the filtration medium (or filtration material) is packed. For example, in one embodiment, the bypass and full flow filter portions 14 and 16 may have a relatively flat body in order to fit on the bottom of truck gear boxes. Also, additional filter layers (e.g. in the form of acetal spacers or containing other type of filtration medium) may also be incorporated into the bypass filter portion 14 and/or full flow filter portion 16.

Although it is preferred that the unitary body 12 of filter 10 or 100 is uniform and cylindrical in shape, the unitary body 12 may also take other shapes and/or be non-uniform in shape, but still contains both the bypass filter portion 14 and full flow filter portion 16 within one unitary body. For example, in the embodiment where the bypass and follow filter portions 14 and 16 have a relatively flat body, the unitary body 12 containing the filter portions may also take a substantially flat shape.

The filter 10, 100 may be constructed of any suitable material including metal or plastic by cutting or injection moulding, for example. It is also possible for the filter 10, 100 to be constructed of a composition of different materials, for example with the interior constructed of plastic and the exterior of metal and vice versa. The filter 10, 100 may also be provided in varied dimensions to suit particular applications. This includes varied proportion of bypass filter portion 14 to full flow filter portion 16 within the filter 10, 100. For example, the filter 10, 100 may comprise substantially 50% bypass filter portion 14 and 50% full flow filter portion 16, substantially 25% bypass filter portion 14 and 75% full flow filter portion 16, substantially 75% bypass filter portion 14 and 25% full flow filter portion 16, substantially 60% bypass filter portion 14 and 40% full flow filter portion 16, or substantially 30% bypass filter portion 14 and 70% full flow filter portion 16.

The filter 10, 100 may be manufactured such that the bypass filter portion 14 and full flow filter portion are manufactured or provided separately and then placed inside the unitary body 12.

For example, the bypass filter portion 14 may be manufactured using injection moulding technique such that the wall(s) encircling the bypass filtration medium 34 may be pre-moulded into two halves which may click together (once the bypass filtration medium 34 is placed inside), or moulded around the bypass filtration medium 34 into one section including the venturi design or pressure release valve for bypass filtered oil or fuel to re-join the return flow (through the return channel 26). The complete bypass filter portion 14 may then be placed into the unitary filter body 12, which may already contain other preassembled components, or the remaining components of the filter 10 or 100 may then be placed inside the unitary body 12 to make a complete combination filter device according to the present invention.

In use, the filter 10, 100 may be threaded onto, or otherwise provided for use with, an engine or other part of a machine on which it is to be used either directly or indirectly, for example through the use of the adapters. Preferably, a threaded portion of the filter 10, 100, either near the outlet 28 or front face 18, is rotated onto a complementarily threaded portion of the engine. As would be understood, it is preferred that the size, shape and configuration of the filter 10, 100 and threaded portion/s thereof are complementary to the engine and/or hose thread on which it is used.

Once fitted, the inlet port 22 can receive oil or fuel from the oil or fuel reservoir of the machinery on which it is used, or other source, as desired. Fluid is received through at least one aperture of the inlet port 22 to the internal part of the filter 10, 100, and specifically to the full flow filter portion 16. The fluid is forced through the full flow filtration medium 24, for capture of particles of a size of 5 microns and larger, to the return channel 26. Due to the maintenance of efficiency of metal fibre filters, 5 micron filter media can make engine lubricated components last 8 to 10 times longer. A vast majority of fluid travels the length of the return channel 26 to exit the filter 10, 100 at the outlet 28 to be used by the engine or other part of the machinery as required. This ensures, for example, that the engine is not starved of oil while it passes through the filter 10, 100. As would be understood, according to the equipment and the volume and pressure of the fluid reservoir on which the filter 10, 100 is used, between about 68 and 183 litres per minute of fluid is returned without travelling through the bypass filter portion 14. Thereafter, a controlled volume of fluid is permitted through the restriction orifice 32.

The fluid permitted through the restriction orifice 32 into the bypass filter portion 14 passes through and is filtered by the bypass filtration medium 34, which allows the passage of oil or fuel but not moisture and fine particulate matter. Accordingly, the bypass filtration medium 34 removes substantially all moisture and fine particles, including sludge, from the fluid being filtered and can eliminate water in emulsion to about 0%-0.1% by content at oil change. Again, according to the equipment and the volume and pressure of the fluid reservoir on which the filter 10, 100 is used, about 1-2 litres per minute of fluid may be filtered through the bypass filter portion 14.

Upon exiting the bypass filtration medium 34, the fluid enters the cavity 36. From there, the fluid travels through the channel 38 to exit the filter 10, 100 through the outlet 28 and is provided to the engine oil gallery.

It has been found that the present invention provides advantages over existing filtration methods and devices including removal and retention of all large manufacturing debris and 99% of moisture and particulate to size 5 micron during engine start up, as well as when the engine is turned off. Concurrently, the filter 10, 100 is able, through its internal bypass filter portion 14, to stop moisture, sludge, resin, lacquer and carbon deposits on piston rings, lubricated components and engine galleries, resulting in preservation of the oil additive package. These outcomes combine to minimise the rate of oil acidation, oxidation and the 'wear makes more wear' effect, to extend oil and filter element change to 1,000 hours or more of use or 100,000 truck miles with a larger scaled filter 10, 100.

Other embodiment filters may be contemplated in accordance with the preferred embodiments of the present invention. For example, while it is preferred that the filter 10, 100 is used to filter oil or diesel or other fuel for a motor, filtration of other fluids and use on other engines or equipment for filtration purposes are able to be performed with the filter 10, 100, or variations thereof, of the present invention. The oil and/or fuel reservoirs on which the combination filter according to the present invention may be used include, but are not limited to, engines, oil sumps, dry sump systems, hydraulics and gear boxes.

Overall, a combination filter according to the present invention is capable of effectively removing particulate and moisture-related contaminants during full flow conditions, and also captures and retains the contaminants during cyclical flow conditions (e.g. at starting and stopping of the engine). The combination filter according to the present invention may also have a more robust full flow and/or bypass filtration medium. Therefore, a combination filter according to the present invention is able to be a superior replacement of the OEM filter as well as a superior replacement of the aftermarket oil/fuel filter, to significantly extend the service life of the oil, fuel and/or the engine itself.

Modifications and variations as would be apparent to a skilled addressee are deemed to be within the scope of the present invention.

The invention claimed is:

1. A filter for filtration of oil and/or fuel comprising a combination of a bypass filter portion and a full flow filter portion wherein,
   the bypass filter portion has a bypass filtration medium and the full flow filter portion has a full flow filtration medium;
   the filter has an inlet port enabling entry of oil or fuel to the full flow filtration medium encircling a return channel through which the oil or fuel may exit the filter;

a bypass inlet is located within the return channel enabling entry of oil or fuel to the bypass filter portion; and a restriction orifice is disposed at a forward end of the bypass filter portion, between the bypass inlet and the bypass filtration medium, thereby allowing a controlled volume of fluid to pass into the bypass filtration medium for filtration before exiting the filter.

2. The filter according to claim 1, wherein the bypass filter portion and full flow filter portion are disposed or encased within a unitary filter body.

3. The filter according to claim 2, wherein the bypass portion is an enclosed unit having its own container wall encircling the bypass filtration medium within the unitary body of the filter.

4. The filter according to claim 1, wherein the restriction orifice has a diameter of between about 0 mm and 20 mm.

5. The filter according to claim 1, wherein the restriction orifice has a diameter of between about 0 mm and 10 mm.

6. The filter according to claim 1, wherein the restriction orifice has a diameter of between about 0 mm and 4 mm.

7. The filter according to claim 6, wherein the restriction orifice allows the passage of between about 0.5 and 2 liters of oil and/or fuel per minute.

8. The filter according to claim 7, wherein the restriction orifice allows the passage of between about 1 and 2 liters of oil and/or fuel per minute.

9. The filter according to claim 1, wherein the pressure of the fluid permeating through the bypass filter portion after passing through the restriction orifice is between about 0 and 10 psi.

10. The filter according to claim 9, wherein the pressure of the fluid permeating through the bypass filter portion is between about 4 and 6 psi.

11. The filter according to claim 1, wherein the bypass inlet has at least one aperture enabling entry of oil or fuel to the bypass filter portion from the return channel.

12. The filter according to claim 1, wherein the return channel extends through to an outlet of the filter.

13. The filter according to claim 12, wherein the bypass portion is disposed between the full flow portion and the outlet of the filter.

14. The filter according to claim 1, wherein the full flow filter portion has a full flow filtration medium in the form of a metal filter medium, a glass fiber medium or a cellulose fiber medium.

15. The filter according to claim 14, wherein the metal filter medium is a pleated stainless-steel metal filter medium.

16. The filter according to claim 1, wherein the bypass filter portion has a bypass filtration medium in the form of a sheet comprised of cellulose fibers in a coiled or rolled arrangement.

17. The filter according to claim 16, wherein the bypass filter medium additionally comprises a satchel of moisture-absorbing polymer.

18. The filter according to claim 1, wherein the bypass filter portion has a deflector.

19. A method of filtration of oil and/or fuel comprising the use of a filter according to claim 1, the method comprising first filtering the oil or fuel through the full flow filter medium, then permitting a controlled volume of fluid, already filtered by the full flow filter portion, through the restriction orifice to be filtered by the bypass filter medium, before returning the filtered oil or fuel to an engine or an engine oil gallery.

* * * * *